United States Patent [19]

Vallance

[11] 4,422,607
[45] Dec. 27, 1983

[54] CLIMBING CHOCKS

[76] Inventor: Mark Vallance, Crest Cottage, Great Hucklow, Tideswell, Derbyshire S17 8RF, England

[21] Appl. No.: 193,912

[22] Filed: Oct. 6, 1980

[30] Foreign Application Priority Data

Oct. 11, 1979 [GB] United Kingdom ............... 7935322

[51] Int. Cl.³ .......................................... F16M 13/00
[52] U.S. Cl. ...................................................... 248/1
[58] Field of Search ................................... 248/1, 317

[56] References Cited

U.S. PATENT DOCUMENTS

| | | | |
|---|---|---|---|
| 3,946,975 | 3/1976 | Lyman | 248/1 |
| 3,948,485 | 4/1976 | Chouinard et al. | 248/135 |
| 3,957,237 | 5/1976 | Campbell | 248/1 |
| 4,044,976 | 8/1977 | Campbell | 248/1 |
| 4,069,991 | 1/1978 | Saunders et al. | 248/1 |
| 4,082,241 | 4/1978 | Burkey | 248/1 |
| 4,083,521 | 4/1978 | Greiner | 248/1 |

FOREIGN PATENT DOCUMENTS

| | | | |
|---|---|---|---|
| 2396562 | 3/1979 | France | 248/1 |
| 2447207 | 9/1980 | France | 248/1 |

OTHER PUBLICATIONS

Clog Advertisement, p. 6, Mountain Magazine, May/-Jun. 1978, No. 61, Mountain Magazine Ltd.

Primary Examiner—William H. Schultz
Attorney, Agent, or Firm—King and Liles

[57] ABSTRACT

The invention relates to climbing chocks such as would be used by mountain climbers. Hitherto simple wedge shapes have been extensively used, the climber carrying a wide variety of sizes to fit into the various cracks in the rock surface. While the sizes have varied the taper angles have tended to be constant and while this is perfectly adequate in an instance where the taper of a crack is substantially the same as the taper on the chock, this does not always follow and particularly in irregularly shaped cracks contact is frequently reduced to two-point contact between the wall of the crack and the chock. The object of the invention is to improve the effectiveness of a climbing chock in irregularly shaped cracks while maintaining a high degree of effectiveness in a smooth tapered crack. This objective is met in a climbing chock having a generally wedge shaped body (1) two opposite side faces (6, 7) of which are respectively of concave and convex configuration.

8 Claims, 8 Drawing Figures

CLIMBING CHOCKS

This invention relates to climbing chocks.

Of the many forms of climbing chocks used by climbers, the simple wedge shape has long been regarded as particularly effective. Wedge shaped chocks are provided in a variety of sizes but the taper angle tends to be constant to fit the taper of a crack in a rock structure that experience teaches as likely to be encountered. In any situation where the taper of a crack is substantially the same as the taper of the wedge shaped chock, the wedge shape is ideal in providing the greatest holding power, but does not always occur. Normally, a particular size of chock can be fitted into an appropriate crack, but there is point contact between the chock and the crack wall because of the almost inevitable irregularities that will be present. This does not detract seriously from the effectiveness of the wedge shape which still co-operates with the general taper of the crack, usually to provide a number of points of contact.

The object of the present invention is to improve the traditional wedge shape chock to render it more effective in an irregular generally tapered crack whilst maintaining a high degree of effectiveness in a smooth tapered crack.

According to the present invention, a climbing chock comprises a generally wedge shaped body, two opposite side faces of which are respectively of concave and convex configuration. Preferably, the end faces of the chock are plain and parallel and are of rectangular shape to provide the chock with wider and narrower sides. The other two opposite sides of the chock may also be respectively concave and convex, but it is preferred that they are plain tapered faces.

Thus, an appropriate size of chock of the invention can be used as a conventional chock to wedge by its plain tapered faces into a smooth sided crack of the same taper angle, but unlike the conventional chock can ensure at least three points of contact in smooth cracks and irregular cracks over a far greater range of taper angles of the cracks. Thus, the concave face allows the chock of the invention to curve round small irregularities in the wall of a crack to ensure two point contact, and the convex face ensures the third point of contact irrespective of the actual angle of taper of the crack.

Thus, the invention improves on the performance of conventional wedge shaped chocks, by virtue of the fact that one size of chock of the invention can be used in cracks over a greater range of angles of taper.

Two embodiments of the invention will now be described with reference to the accompanying drawings in which.

Figure 1:
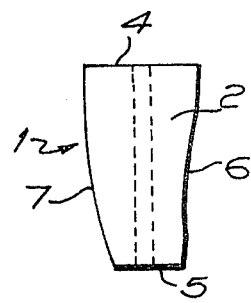
FIG. 1 is a side elevation of a climbing chock according to the invention.
Figure 2:
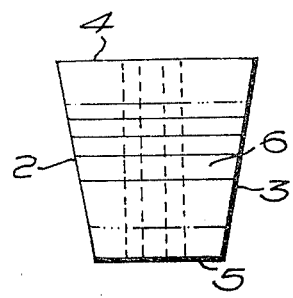
FIG. 2 is a front elevation of the chock of FIG. 1.
Figure 4:
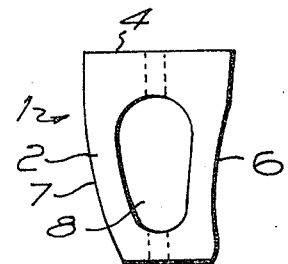
Figures 2A, 5:
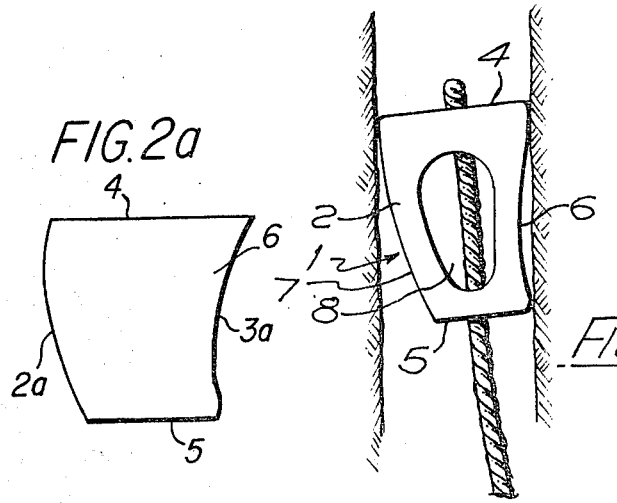
FIG. 2a is a front elevational view of an alternative embodiment of the invention.
Figure 6:
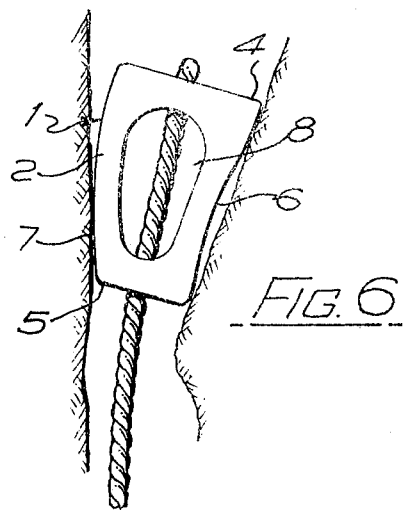
Figure 7:
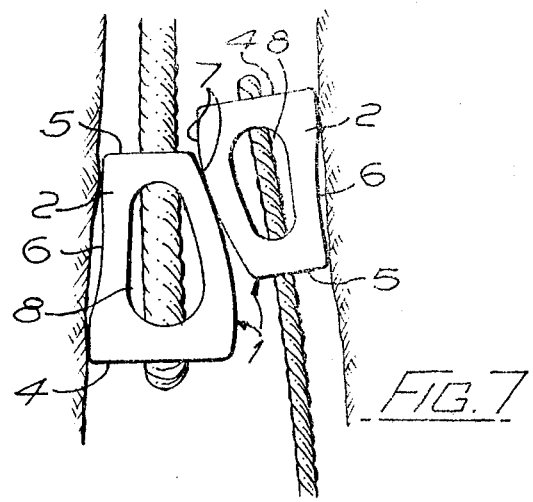

FIG. 4 corresponds to FIG. 1 but shows a modified construction;

FIGS. 5 and 6 show the chock of FIG. 4 positioned in two cracks of different taper angles; and FIG. 7 shows chocks in accordance with FIG. 4 applied to a wider crack.

Figure 3:
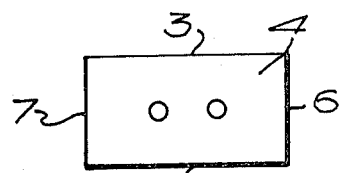
FIG. 3 is a plan view of the chock of FIG. 1.

In FIGS. 1 to 3 a climbing chock 1 is of generally wedge shape with plain tapered faces 2 and 3 and with plain and parallel rectangular end faces 4 and 5. The two opposite faces 6 and 7 are respectively concave and convex. The curves of the two faces extend substantially in the same direction and the degree of curvature is substantially the same (see FIGS. 4 and 5). The chock of FIG. 4 conforms in all respect to the chock of FIGS. 1 and 3 except that it is of larger size and to reduce its weight it is provided with a central hole 8 extending between the side faces 2 and 3.

Thus, with an appropriate size of chock of the invention, it can be used in conventional manner to wedge by its plain taper surfaces 2 and 3 in a smooth sided crack of substantially the same taper angle, but in contrast with a conventional chock, the chock of the invention can be used in irregular cracks and in smooth cracks over a far greater range of taper angles thereby allowing a climber to carry a reduced number of chocks in the reasonable certainty that the chocks carried can lock adequately into all cracks.

Thus, as is shown in FIGS. 5 and 6 a chock of the invention can be placed within a crack such that it makes three point contact by its concave and convex sides 6 and 7 and as can be seen on comparing FIGS. 5 and 6 the same size of chock can be fitted into cracks of widely varying taper angles. In FIG. 5 the crack illustrated is almost parallel sided and when the chock makes three point contact, with the contact on the convex side being towards its upper end. With the acute angled crack shown in FIG. 6 there is again three point contact but in this instance the contact point on the convex face is towards its lower end.

As is shown particularly by FIG. 7 the chocks of the invention have still greater versatility over conventional chocks in that they can accommodate cracks wider than an individual chock. Thus, with two appropriately sized chocks placed within a wide crack, and when those chocks can be of the same or different sizes, the situation arises where at the concave side of each chock there is two point contact made with the side walls of the crack, the third point of contact being provided between the two chocks themselves and when again the chocks can be effectively jammed within the crack.

In the alternative embodiment shown in FIG. 2a, the two opposite sides 2a, 3a are respectively convex and concave. As set forth above, these curved faces take the place of plain tapered faces 2, 3 of FIG. 2. The two additional curved faces 2a, 3a give additional three point engagement across the wider dimension of the climbing chock, where desired.

Thus with the chocks of the invention secured to a length of wire rope or rope in relatively conventional manner, the chocks can be wedged into an appropriate crack and the wire rope or rope attached to the chock itself attached to the climbing rope giving great security to the climber.

The rope enters the chock at the narrow end face 5, passes through the longitudinal passageway to the end face 4, where the rope exits the chock and loops back down through the longitudinal passageway to emerge again from the chock at the narrow end face 5, as shown by viewing FIGS. 3 and 5 together. A secure three point engagement is attained with the direction of loading being longitudinally of the body of the chock, as shown in FIG. 3.

What I claim is:

1. A climbing chock for positioning in a crack in a rock formation comprising a generally wedge shaped body including four side faces, two opposite side faces of which are respectively of concave and convex configuration, said body also being formed with longitudinal passageway means extending in the direction and within the confines of said side faces through which a line is passed, whereby the applied force along said line allows said concave and convex faces to move toward engagement with the sides of the crack while resisting pivoting action so as to tend to cause secure three point engagement of said chock.

2. A climbing chock as in claim 1 further comprising two end faces to the chock, said first end face being smaller than said second end face, both of said end faces being plain and parallel and each of rectangular shape whereby to provide the chock with wider and narrower sides; said first face including said longitudinal passageway means from which said line emerges from said chock.

3. A climbing chock as in claim 1, wherein the other two opposite sides of the chock are respectively concave and convex.

4. A climbing chock comprising a generally wedge shaped body, two opposite side faces of which are respectively of concave and convex configuration to provide secure three point engagement across a crack in rock being climbed under substantially all conditions of the crack, the other two opposite side faces of which are plain and tapered, the chock having plain and parallel end faces of rectangular shape whereby to provide the chock with wider and narrower sides.

5. A climbing chock as in claim 4, wherein the chock is provided with an aperture extending across the plain tapered faces.

6. A climbing chock as in claim 4, wherein the chock is secured to a length of rope for securing to a climbing rope.

7. The climbing chock of claim 1 or 4 wherein the degree of curvature of the opposite concave and convex side faces are substantially the same.

8. The climbing chock of claim 1 or 4 wherein the curves of the opposite concave and convex side faces extend in substantially the same direction.

* * * * *